Nov. 7, 1950　　　　J. I. GLEEKMAN　　　　2,529,012
RAKE

Filed June 17, 1948

Inventor

John I. Gleekman

By　*Clarence A. O'Brien*
　　*and Harvey B. Jacobson*
　　　　　　　　Attorneys

Patented Nov. 7, 1950

2,529,012

UNITED STATES PATENT OFFICE 2,529,012

RAKE

John I. Gleekman, Trenton, N. J.

Application June 17, 1948, Serial No. 33,507

2 Claims. (Cl. 119—83)

This invention appertains to novel and useful improvements in implements for use in combing the fur or hair of animals.

An object of this invention is to easily and conveniently comb the undesired material which accumulates in the fur or hair of animals, therefrom in grooming the said animals.

Another object of this invention is to contour the handle thereof in order to facilitate removal of the handle from the hand of an operator when the tines of the rake engage an obstacle, thus preventing damage or injury to the fur and skin of an animal.

Another object of this invention is to so contour the tines that they will engage the skin and fur or hair of an animal without digging into his body or skin.

Another purpose of this invention is to provide an extremely simple device of a nature to be described which is inexpensive in its construction and which serves its intended purposes efficaciously.

Ancillary objects and features of novelty will become apparent to those skilled in the art, in following the description of the preferred form of the invention, illustrated in the accompanying drawings, wherein.

This invention provides a device for combing or otherwise grooming the hair or fur of an animal. In use of the invention, the matting that is formed and accumulated on animals may be lifted therefrom with a minimum of injury to the fur or hair. The construction of the rake is such that it lifts the matting out without pulling or breaking the hair. This construction and function is supported in the shape of the tines which are bent at the proper angle to enable the movement of this rake over the body of the animal smoothly.

The particular shape of the handle includes a smooth contour without a grip arrangement as a safety feature. If and when the rake would encounter a tight knot in the hair of the animal, the hand will slip from the handle and prevent injury to the skin of the animal.

The housing 10 is provided and is generally indicated at 10. This housing is used as a handle and also as a recipient for a plurality of tines indicated as 12. The materials of construction may be many, including metal, commercial plastic, wood and others. However, it is preferred that the tines be made of a resilient material such as spring steel, wire or the like.

Figure 1:
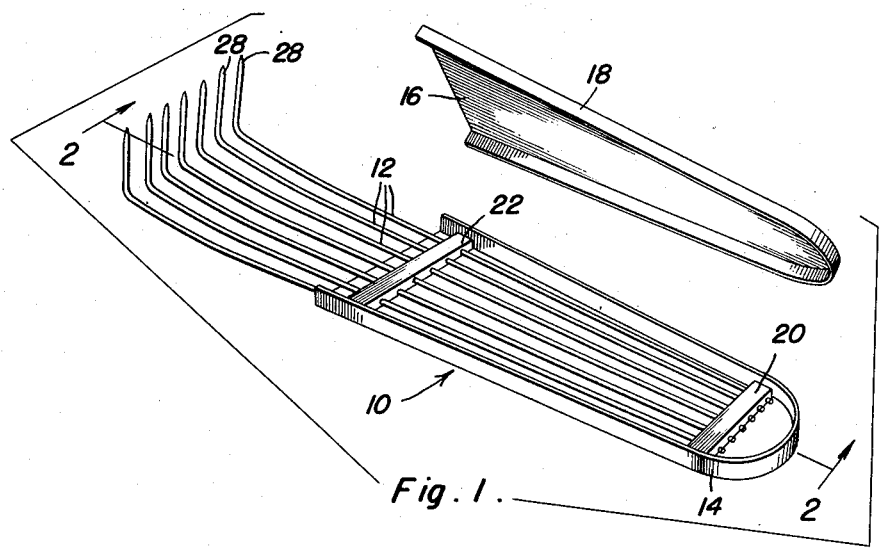
Figure 1 is a perspective view of the preferred form of the invention.
Figure 2:
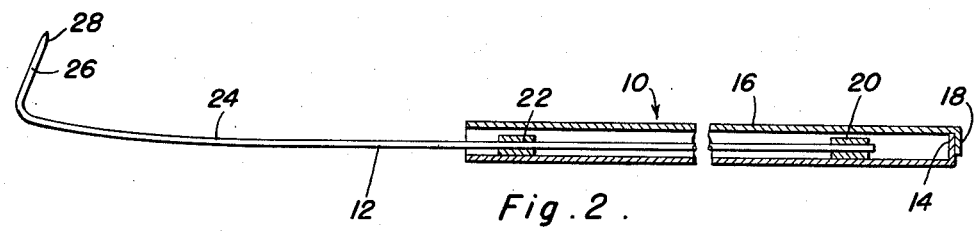
Figure 2 is a sectional view taken substantially on line 2—2 of Figure 1 in the direction of the arrows.
Figure 3:
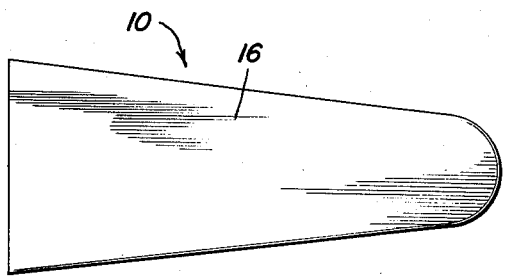
Figure 3 is a plan view of the handle or case forming an important portion of the invention.

The specific structure of the housing 10 may be seen best in Figure 1 wherein the base portion is provided with an upturned flange 14. The cover portion 16 is provided with a complemental flange 18 which of course, cooperates with the said flange 14 as is illustrated in Figure 2. By this construction a handle is provided and due to the configuration of the said handle (see Figure 3) the hand of the operator is adapted to grip the same and the said handle may be easily slipped from the operator's hand upon engaging a tight knot or the like by the tines 12.

The housing 10 is provided with an open end having the tines 12 extending therefrom. This open end is wider in cross section than the opposite end to facilitate in the slipping of the handle from the hand.

A pair of cross members 20 and 22 respectively may be provided in the housing 10 and a plurality of apertures may be formed therein. The tines 12 are adapted to extend through these apertures in convergent fashion and may be retained in place by means of soldering, welding or the like. Of course, if it is found desirable the tines may be attached directly to one of the segments of the housing 10.

Referring now to Figure 2 primarily, it will be seen that each of the tines 12 is provided with a slight bend 24 for improving the application of the invention and for directing the extensions 26 of the said tines in the proper angular position relative to the skin or hide of an animal. Terminal portions of the said extensions are rounded as at 28 to avoid projection of the terminal portions into the skin of the animal.

Due to the extreme simplicity achieved by the invention a further description thereof is deemed unnecessary. However, it is apparent that variations may be made without departing from the spirit thereof.

Having described the invention, what is claimed as new is:

1. In a rake for use in combing animal hair, an elongated flat housing having an open end and an opposite end and being relatively wider at the open end than the opposite end, a plurality of resilient spaced tines in part disposed in said housing and in part extending through the open end, the parts of the tines extending from the housing having smoothly curved bends therein and terminating in sharply angled extensions, cross members having apertures disposed in spaced relationship within said housing and having the parts of said tines within said housing disposed in said apertures thereby supporting said tines at spaced points of the tines within the housing.

2. An animal hair rake comprising a housing having an open end, a number of tines, each tine having an outer end and an inner end, and its inner end being disposed in said housing and its outer end having an angled extension disposed on the exterior of said housing, a pair of spaced cross members disposed entirely within said housing and having a plurality of openings therein with the parts of said tines which are disposed in said housing passed through and fixed in said openings.

JOHN I. GLEEKMAN.

REFERENCES CITED

The following references are of record in the file of this patent:

UNITED STATES PATENTS

| Number | Name | Date |
|---|---|---|
| 1,008,382 | Sourek | Nov. 14, 1911 |
| 1,177,333 | Ihrig | Mar. 28, 1916 |
| 1,785,320 | Lorber | Dec. 16, 1930 |
| 1,869,647 | Anderson | Aug. 2, 1932 |
| 1,887,580 | Horstman | Nov. 8, 1932 |
| 1,909,754 | Carlson | May 16, 1933 |
| 1,930,977 | Kirch | Oct. 17, 1933 |